(12) United States Patent
Chen

(10) Patent No.: US 12,275,400 B2
(45) Date of Patent: Apr. 15, 2025

(54) METHOD FOR GENERATING SPEED CONTROL MODEL, VEHICLE CONTROL METHOD AND APPARATUS

(71) Applicant: Momenta (Suzhou) Technology Co., Ltd., Suzhou (CN)

(72) Inventor: Yu Chen, Suzhou (CN)

(73) Assignee: Momenta (Suzhou) Technology Co., Ltd., Suzhou (CN)

( * ) Notice: Subject to any disclaimer, the term of this patent is extended or adjusted under 35 U.S.C. 154(b) by 241 days.

(21) Appl. No.: 17/881,787

(22) Filed: Aug. 5, 2022

(65) Prior Publication Data
US 2022/0371586 A1 Nov. 24, 2022

Related U.S. Application Data

(63) Continuation of application No. PCT/CN2022/095105, filed on May 26, 2022.

(30) Foreign Application Priority Data

Apr. 13, 2022 (CN) .......................... 202210384182.1

(51) Int. Cl.
*B60W 30/14* (2006.01)
*B60W 30/18* (2012.01)
(Continued)

(52) U.S. Cl.
CPC .... *B60W 30/143* (2013.01); *B60W 30/18159* (2020.02); *B60W 40/072* (2013.01);
(Continued)

(58) Field of Classification Search
CPC ......... B60W 30/143; B60W 30/18159; B60W 40/072; B60W 40/105; B60W 2552/30;
(Continued)

(56) References Cited

U.S. PATENT DOCUMENTS

2015/0094928 A1* 4/2015 Matsumura .......... G07C 5/0841
701/93
2017/0135621 A1* 5/2017 Lee .......................... A61B 5/18
(Continued)

FOREIGN PATENT DOCUMENTS

| CN | 109703566 A | 5/2019 |
|---|---|---|
| CN | 109878534 A | 6/2019 |

(Continued)

*Primary Examiner* — Tiffany P Young
*Assistant Examiner* — Ashleigh Nicole Turnbaugh

(57) ABSTRACT

Disclosed in the present application are a method for generating a speed control model, a vehicle control method and an apparatus. The vehicle control method comprises: acquiring the current geographic location of a target vehicle and a target speed control feature corresponding to the current geographic location, the target speed control feature being a feature that affects the speed of the vehicle; inputting the current geographic location and the target speed control feature corresponding to the current geographic location into a speed control model to obtain the current target speed of the target vehicle, the speed control model being generated by training starting coordinates and ending coordinates of each preset lane segment in the map data, the target speed control feature and a speed control label in the preset lane segment; and controlling the target vehicle to drive according to the current target speed.

17 Claims, 5 Drawing Sheets

---

Acquire training sample set, where each training sample in the training sample set includes: starting coordinates and ending coordinates of each preset lane segment in map data, target speed control feature and speed control label in preset lane segment — S110

Perform training using training sample set to obtain speed control model for controlling vehicle speed — S120

(51) Int. Cl.
  *B60W 40/072* (2012.01)
  *B60W 40/105* (2012.01)
(52) U.S. Cl.
  CPC ....... *B60W 40/105* (2013.01); *B60W 2552/30* (2020.02); *B60W 2555/60* (2020.02); *B60W 2556/40* (2020.02)
(58) Field of Classification Search
  CPC ......... B60W 2555/60; B60W 2556/40; B60W 2556/10; B60W 2720/10; G08G 1/0129; G08G 1/0145; G08G 1/052; G08G 1/167
  USPC .......................................................... 701/93
  See application file for complete search history.

(56) References Cited

U.S. PATENT DOCUMENTS

| | | | | |
|---|---|---|---|---|
| 2019/0322276 A1* | 10/2019 | Narmack | ............... | B60W 40/09 |
| 2020/0193157 A1* | 6/2020 | Soni | .................... | G06F 18/2163 |
| 2020/0406894 A1* | 12/2020 | Akella | ................. | B60W 10/18 |

FOREIGN PATENT DOCUMENTS

| | | | |
|---|---|---|---|
| CN | 110827546 | A | 2/2020 |
| CN | 111376912 | A | 7/2020 |
| CN | 111845743 | A | 10/2020 |
| CN | 112329916 | A | 2/2021 |
| CN | 113191353 | A | 7/2021 |
| CN | 114454878 | A | 5/2022 |
| JP | 2000127798 | A | 5/2000 |
| WO | 2019056497 | A1 | 3/2019 |

\* cited by examiner

METHOD FOR GENERATING SPEED CONTROL MODEL, VEHICLE CONTROL METHOD AND APPARATUS

CROSS-REFERENCE TO RELATED APPLICATIONS

This application is a continuation of International Application No. PCT/CN2022/095105, filed on May 26, 2022, which claims priority to Chinese Patent Application No. 202210384182.1, filed on Apr. 13, 2022. The disclosures of the aforementioned applications are hereby incorporated by reference in their entireties.

TECHNICAL FIELD

The present application relates to the technical field of automobiles, and in particular to a method for generating a speed control model, a vehicle control method and an apparatus.

BACKGROUND

During driving of vehicles, an excessively high speed may cause traffic accidents, and an excessively low speed may make it difficult for following vehicles to drive and cause congestion. Therefore, an appropriate speed can improve traffic smoothness while ensuring traffic safety. However, at present, the vehicle speed is mainly adjusted by the driver's own driving experience and/or the road conditions around the vehicle, and it is difficult to control the vehicles on the entire road network to drive at an appropriate vehicle speed on the driving lane segment.

In summary, how to intelligently control the vehicle is an urgent problem to be solved.

SUMMARY

The present application provides a method for generating a speed control model, a vehicle control method and an apparatus. The present application can solve the problem that an intelligent driving vehicle or an automatic driving vehicle is difficult to drive at an appropriate speed, which may easily cause traffic congestion and traffic jams.

The specific technical solutions are as follows:

In a first aspect, an embodiment of the present application provides a method for generating a speed control model, the method including:
  acquiring a training sample set, where each training sample in the training sample set includes: starting coordinates and ending coordinates of each preset lane segment in map data, a target speed control feature and a speed control label in the preset lane segment, the target speed control feature being a feature that affects the speed of a vehicle, and the speed control label being a label of the target speed obtained according to empirical speed counting; and
  carrying out training using the training sample set to obtain a speed control model for controlling the vehicle speed.

It can be seen from the above solution that, compared with the related technologies that rely on the driver's own driving experience and/or the road conditions around the vehicle to adjust the vehicle speed, the embodiment of the present application can train using the training sample set composed of starting coordinates and ending coordinates of each preset lane segment in the map data and target speed control features and speed control labels in the preset lane segment to obtain the speed control module, so that vehicles can be automatically provided with an appropriate target speed on the basis of the speed control model, which can allow the entire road network to drive at an appropriate speed, thereby improving traffic smoothness while ensuring traffic safety.

In a first possible implementation of the first aspect, the method for acquiring the target speed control feature includes:
  dividing the lanes in the map data into a first lane partition and a second lane partition, where the first lane partition and the second lane partition indicate different to-be-measured speed control features; and
  determining the to-be-measured speed control feature as the target speed control feature when the difference between a first empirical upper limit speed distribution and a second empirical upper limit speed distribution is greater than or equal to a first difference threshold, where the first empirical upper limit speed distribution includes a plurality of empirical upper limit speeds of a plurality of vehicles during driving in the first lane partition, and the second empirical upper limit speed distribution includes a plurality of empirical upper limit speeds of a plurality of vehicles during driving in the second lane partition.

It can be seen from the above solution that, in the embodiment of the present application, the target speed control feature that affects the vehicle speed can be mined through the difference of the empirical upper limit speed distribution of the two lane partitions divided on the basis of the to-be-measured speed control feature, instead of being mined relying on manual experience, thereby not only ensuring the integrity and accuracy in mining the target speed control feature, but also improving the mining efficiency.

In a second possible implementation of the first aspect, the method for acquiring the speed control label includes:
  For each to-be-counted preset lane segment, performing fitting on a plurality of empirical speeds on the to-be-counted preset lane segment to obtain the empirical speeds of a plurality of speed grades, where the speed grade is positively correlated with the empirical speed; and
  using the average value of the empirical speeds of the highest speed grade as a target speed of the to-be-counted preset lane segment, and generating a speed control label including the target speed.

In a third possible implementation of the first aspect, before carrying out training using the training sample set to obtain the speed control model for controlling the vehicle speed, the method further includes:
  rotating a first preset lane segment, and adding the starting coordinates, the ending coordinates of the rotated first preset lane segment, and the target speed control feature corresponding to the rotated first preset lane segment and the speed control label corresponding to the rotated first preset lane segment to the training sample set as the training sample, where the first preset lane segment is the preset lane segment for rotating; and/or,
  proportionally scaling a second preset lane segment and the speed control label corresponding to the second preset lane segment, and adding the starting coordinates and the ending coordinates of the scaled second preset lane segment, the target speed control feature corresponding to the scaled second preset lane segment and the speed control label corresponding to the scaled second preset lane segment to the training sample set as the training sample, where the second preset lane segment is the preset lane segment for scaling.

It can be seen from the above solution that, in the embodiment of the present application, training samples of more scenes can be obtained by rotating and/or scaling the original training samples, so that the speed control model can learn the training set data with more generalization ability, and thereby improving the prediction accuracy of the speed control model.

In a fourth possible implementation of the first aspect, when the preset lane segment includes traffic lights and/or obstacles, the training sample corresponding to the preset lane segment further includes traffic light labels and/or obstacle labels in the preset lane segment.

In a second aspect, an embodiment of the present application provides a vehicle control method, the method including:

acquiring a current geographic location of a target vehicle and a target speed control feature corresponding to the current geographic location, where the target speed control feature is a feature that affects the speed of the vehicle;

inputting the current geographic location and the target speed control feature corresponding to the current geographic location into a speed control model to obtain a current target speed of the target vehicle, where the speed control model is generated by any possible implementation of the first aspect; and controlling the target vehicle to drive according to the current target speed.

It can be seen from the above solution that, compared with the related technologies that rely on the driver's own driving experience and/or the road conditions around the vehicle to adjust the vehicle speed, the embodiment of the present application achieves that appropriate current target speed can be automatically predicated by inputting the current geographic location of the target vehicle and the target speed control feature corresponding to the current geographic location into pre-trained speed control model, and control the target vehicle to drive according to the current target speed, so as to allow the entire roadnetwork to drive at an appropriate speed, thereby improving traffic smoothness while ensuring traffic safety.

In a first possible implementation of the second aspect, controlling the target vehicle to drive according to the current target speed includes:

adjusting the current vehicle speed to the current target speed; or, controlling the target vehicle to drive according to the current target speed when the current target speed is within a preset speed control range.

In a second possible implementation of the second aspect, the controlling the target vehicle to drive according to the current target speed when the current target speed is within the preset speed control range includes:

determining a target preset speed control sub-range to which the current target speed belongs, and adjusting the current vehicle speed to a specified speed within the target preset speed control sub-range when the current target speed is within the preset speed control range, where the preset speed control range includes a plurality of preset speed control sub-ranges; or, adjusting the current vehicle speed to the current target speed when the current target speed is within the preset speed control range.

In a third possible implementation of the second aspect, the target speed control feature includes at least one of the following:

road curvature, turning left at an intersection, turning right at an intersection, driving straight at an intersection, a ramp, a merging lane, and a diverging lane.

In a fourth possible implementation of the second aspect, the controlling the target vehicle to drive according to the current target speed includes:

controlling the target vehicle to drive according to the current target speed when a preset speed condition is met, where the preset speed condition includes at least one of the following:

the current geographic location is beyond the legal speed limit range;

the current geographic location is within the legal speed limit range, and the current target speed is less than or equal to the legal speed limit corresponding to the current geographic location;

the difference between the current target speed and the last target speed is less than or equal to a second difference threshold, where the last target speed is the target speed last determined on the basis of the speed control model;

the current target speed is less than or equal to the speed of the vehicle in front of the lane to which the target vehicle belongs; and the distance between the current geographic location and the target traffic light is greater than or equal to a preset distance threshold, where the target traffic light is the closest traffic light in the driving direction of the target vehicle.

It can be seen from the above solution that, in the embodiment of the present application, after the current target speed is predicted, the target vehicle is not blindly controlled to drive according to the current target speed directly, but by combining traffic regulations (such as legal speed limit) and actual road conditions (such as the driving situation of the vehicle ahead, traffic lights) to determine whether to control the target vehicle to drive according to the current target speed, so that the target vehicle can be provided with a suitable and safe speed to drive while obeying traffic rules.

In a fifth possible implementation of the second aspect, the method further includes:

controlling the target vehicle to drive according to at least one of the legal speed limit, the last target speed and the speed of the vehicle in front of the lane to which the target vehicle belongs when the preset speed condition is not met.

In a third aspect, an embodiment of the present application provides an apparatus for generating a speed control model, the apparatus including:

a sample acquiring unit for acquiring a training sample set, where each training sample in the training sample set includes: starting coordinates and ending coordinates of each preset lane segment in the map data, a target speed control feature and a speed control label in the preset lane segment, the target speed control feature being a feature that affects the speed of a vehicle, and the speed control label being a label of the target speed obtained according to empirical speed counting; and a model generating unit for carrying out training using the training sample set to obtain the speed control model for controlling the vehicle speed.

In a first possible implementation of the third aspect, the sample acquiring unit includes:

a dividing module for dividing the lanes in the map data into a first lane partition and a second lane partition, where the first lane partition and the second lane partition indicate different to-be-measured speed control features; and a determining module for determining the to-be-measured speed control feature as the target speed control feature when the difference between the first empirical upper limit speed distribution and the second empirical upper limit speed distribution is greater than or equal to the first difference threshold, where the first empirical upper limit speed distribution includes a plurality of empirical upper limit speeds of a plurality of vehicles during driving in the first lane partition, and the second empirical upper limit speed distribution includes a plurality of empirical upper limit speeds of a plurality of vehicles during driving in the second lane partition.

In a second possible implementation of the third aspect, the sample acquiring unit includes:

a fitting module for, for each to-be-counted preset lane segment, performing fitting on a plurality of empirical speeds on the to-be-counted preset lane segment to obtain the empirical speeds of a plurality of speed grades, where the speed grade is positively correlated with the empirical speed;

a label generating module for using the average value of the empirical speeds of the highest speed grade as the target speed of the to-be-counted preset lane segment, and generating a speed control label including the target speed.

In a third possible implementation of the third aspect, the sample acquiring unit further includes: a first sample amplification module and/or a second sample amplification module;

the first sample amplification module is used for rotating the first preset lane segment before carrying out training using the training sample set to obtain the speed control model for controlling the vehicle speed, and adding the starting coordinates, the ending coordinates of the rotated first preset lane segment, and the target speed control feature corresponding to the rotated first preset lane segment and the speed control label corresponding to the rotated first preset lane segment to the training sample set as the training sample, where the first preset lane segment is the preset lane segment for rotating; and/or the second sample amplification module is used for proportionally scaling the second preset lane segment and the speed control label corresponding to the second preset lane segment, and adding the starting coordinates and the ending coordinates of the scaled second preset lane segment, the target speed control feature corresponding to the scaled second preset lane segment and the speed control label corresponding to the scaled second preset lane segment to the training sample set as the training sample, where the second preset lane segment is the preset lane segment for scaling.

In a fourth possible implementation of the third aspect, when the preset lane segment includes traffic lights and/or obstacles, the training sample corresponding to the preset lane segment further includes traffic light labels and/or obstacle labels in the preset lane segment.

In a fourth aspect, an embodiment of the present application provides a vehicle control apparatus, the apparatus including:

an acquiring unit for acquiring a current geographic location of a target vehicle and a target speed control feature corresponding to the current geographic location, where the target speed control feature is a feature that affects the speed of the vehicle;

a speed predicting unit for inputting the current geographic location and the target speed control feature corresponding to the current geographic location into a speed control model to obtain a current target speed of the target vehicle, where the speed control model is generated by the method of any possible implementation of the first aspect; and a speed control unit for controlling the target vehicle to drive according to the current target speed.

In a first possible implementation of the fourth aspect, the speed control unit includes a first speed control module and/or a second speed control module;

the first speed control module is used for adjusting the current vehicle speed to the current target speed;

the second speed control module is used for controlling the target vehicle to drive according to the current target speed when the current target speed is within a preset speed control range.

In a second possible implementation of the fourth aspect, the second speed control module is used for determining a target preset speed control sub-range to which the current target speed belongs, and adjusting the current vehicle speed to a specified speed within the target preset speed control sub-range when the current target speed is within the preset speed control range, where the preset speed control range includes a plurality of preset speed control sub-ranges; or, adjusting the current vehicle speed to the current target speed when the current target speed is within the preset speed control range.

In a third possible implementation of the fourth aspect, the target speed control feature includes at least one of the following:

road curvature, turning left at an intersection, turning right at an intersection, driving straight at an intersection, a ramp, a merging lane, and a diverging lane.

In a fourth possible implementation of the fourth aspect, the speed control unit is used for controlling the target vehicle to drive according to the current target speed when a preset speed condition is met, where the preset speed condition includes at least one of the following:

the current geographic location is beyond the legal speed limit range;

the current geographic location is within the legal speed limit range, and the current target speed is less than or equal to the legal speed limit corresponding to the current geographic location;

the difference between the current target speed and the last target speed is less than or equal to a second difference threshold, where the last target speed is the target speed last determined on the basis of the speed control model;

the current target speed is less than or equal to the speed of the vehicle in front of the lane to which the target vehicle belongs; and the distance between the current geographic location and the target traffic light is greater than or equal to a preset distance threshold, where the target traffic light is the closest traffic light in the driving direction of the target vehicle.

In a fifth possible implementation of the fourth aspect, the speed control unit is further used for controlling the target vehicle to drive according to at least one of the legal speed limit, the last target speed and the speed of the vehicle in front of the lane to which the target vehicle belongs when the preset speed condition is not met.

In a fifth aspect, an embodiment of the present application provides a storage medium having a computer program stored thereon, where the program, when executed by a processor, implements the method according to any possible implementation of the first aspect or the second aspect.

In a sixth aspect, an embodiment of the present application provides an electronic device, the electronic device including:
one or more processors;
a storage apparatus, configured to store one or more programs,
where the one or more programs, when executed by the one or more processors, cause the electronic device to implement the method according to any possible implementation of the first aspect or the second aspect.

In a seventh aspect, an embodiment of the present application provides a vehicle, the vehicle including the apparatus according to any possible implementation of the third aspect or the fourth aspect or including the electronic device according to the sixth aspect.

BRIEF DESCRIPTION OF DRAWINGS

In order to more clearly illustrate the technical solutions in the embodiments of the present application or the prior art, the following briefly introduces the accompanying drawings that are required in the description of the embodiments or the prior art. Obviously, the drawings in the following description are only some embodiments of the present application. For those of ordinary skill in the art, other drawings can also be obtained from these drawings without creative effort.

DETAILED DESCRIPTION OF THE EMBODIMENTS

The technical solutions in the embodiments of the present application will be clearly and completely described below with reference to the accompanying drawings in the embodiments of the present application. Obviously, the described embodiments are only part of the embodiments of the present application, but not all of the embodiments. Based on the embodiments in the present application, all other embodiments obtained by those of ordinary skill in the art without creative efforts fall within the protection scope of the present application.

It should be noted that the embodiments in the present application and the features of the embodiments may be combined with each other in the case of no conflict. The terms "including" and "having" in the embodiments of the present application and the accompanying drawings and any variant thereof are intended to cover non-exclusive inclusion. For example, a process, method, system, product or apparatus that includes a series of steps or units is not limited to the listed steps or units, but optionally also includes unlisted steps or units, or optionally also includes other steps or units inherent to these processes, methods, products or apparatuses.

Figure 1:
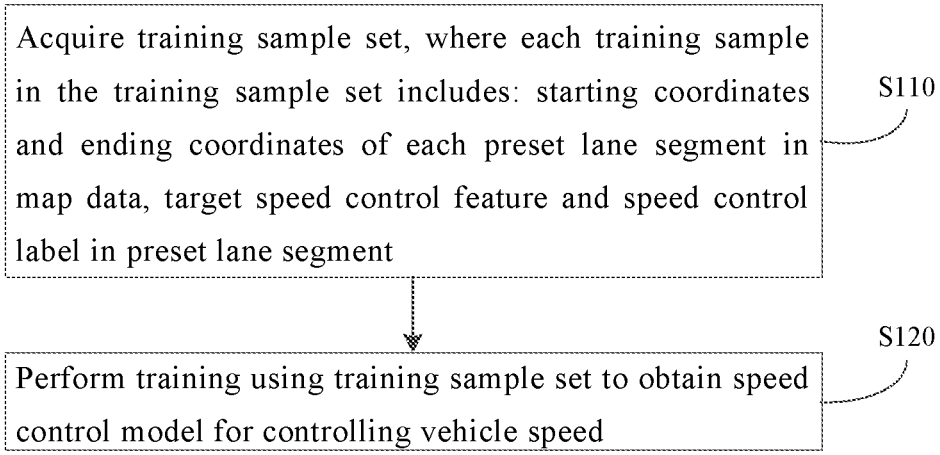
FIG. 1 is a schematic flow chart of a method for generating a speed control model according to an embodiment of the present application.

FIG. 1 is a schematic flowchart of a method for generating a speed control model. The method may be applied to electronic device or computer apparatus, and specifically may be applied to vehicles or servers, and the method may include the following steps:

S110: a training sample set is acquired, where each training sample in the training sample set includes: starting coordinates and ending coordinates of each preset lane segment in the map data, a target speed control feature and a speed control label in the preset lane segment.

The target speed control feature is a feature that affects the speed of a vehicle, and includes at least one of the following: road curvature, turning left at an intersection, turning right at an intersection, driving straight at an intersection, a ramp, a merging lane, and a diverging lane. The speed control label is a label of the target speed obtained according to empirical speed counting, and the empirical speed is the actual speed of vehicles. The target speed control feature in the preset lane segment may be the target speed control feature of each road point in the preset lane segment, and the speed control label in the preset lane segment may also be the speed control label of each road point in the preset lane segment. When the target speed control features and speed control labels of the entire preset lane segment are the same, in order to save storage space, the target speed control features and speed control labels of a plurality of road points in the preset lane segment may be combined into one target speed control feature and one speed control label respectively.

In one implementation, the method for acquiring the target speed control feature includes: dividing the lanes in the map data into a first lane partition and a second lane partition, where the first lane partition and the second lane partition indicate different to-be-measured speed control features; determining the to-be-measured speed control feature as the target speed control feature when the difference between the first empirical upper limit speed distribution and the second empirical upper limit speed distribution is greater than or equal to the first difference threshold, where the first empirical upper limit speed distribution includes a plurality of empirical upper limit speeds of a plurality of vehicles during driving in the first lane partition, and the second empirical upper limit speed distribution includes a plurality of empirical upper limit speeds of a plurality of vehicles during driving in the second lane partition.

The first lane partition and the second lane partition indicating different to-be-measured speed control features means that the feature degrees of the same to-be-measured control feature included in the first lane partition and the second lane partition are different. For example, both the first lane partition and the second lane partition include a to-be-measured control feature a, but the feature values of the to-be-measured control feature a included in the first lane partition and the second lane partition are different, such as different road curvatures. For another example, if the first lane partition does not include a to-be-measured speed control feature b, but the second lane partition includes the to-be-measured speed control feature b, the feature degree of the to-be-measured speed control feature b included in the first lane partition is 0, and the feature degree of the to-be-measured speed control feature b included in the second lane partition is 100%.

The to-be-measured speed control feature includes at least one of the following: road curvature, turning left at an intersection, turning right at an intersection, driving straight at an intersection, a ramp, a merging lane, and a diverging lane.

When the to-be-measured speed control feature includes road curvature, a specific implementation of dividing the lane in the map data into the first lane partition and the second lane partition includes: dividing the lane in the map data into a first lane partition that meets the first road curvature range and a second lane partition that meets a second road curvature range. The first road curvature range and the second road curvature range do not intersect, and when the two road curvature ranges are divided, the preset road curvature can be used as a critical value to divide the road curvature ranges into a low road curvature range and a high road curvature range respectively. The preset road curvature is an empirical value.

The specific calculation method of the road curvature includes: obtaining the road curvature by performing curve fitting on the coordinates of the road points in the map data. For example, curve fitting can be performed on the coordinates of road points in the map data to obtain a curve closest to the shape of the lane, and then the road curvature of each road point on the curve can be calculated.

When the to-be-measured speed control feature includes any one of turning left at an intersection, turning right at an intersection, driving straight at an intersection, a ramp, a merging lane and a diverging lane, the specific implementation of dividing the lanes in the map data into the first lane partition and the second lane partition includes: dividing the lanes in the map data into a first lane partition with the to-be-measured speed control feature and a second lane partition without the to-be-measured speed control feature. For example, the lanes in the map data are divided into lane partitions that include turning left at intersections and lane partitions that do not include turning left at intersections.

The empirical upper limit speed refers to the maximum speed of a plurality of vehicles during driving in the same lane segment. For the same to-be-measured speed control feature, a plurality of lanes in the map data can be divided into a first lane partition and a second lane partition, so that the first lane partition includes at least one first lane sub-partition, and the second lane partition includes at least one second lane sub-partition.

The following is an example of the empirical upper limit speed:

when the to-be-measured speed control feature is the road curvature, the a plurality of lanes in the map data can be divided into the first lane partition and the second lane partition, so that the first lane partition includes low-curvature lane sub-partition 1, low-curvature lane sub-partition 2 and low-curvature lane sub-partition 3, and the second lane partition includes high-curvature lane sub-partition 1, high-curvature lane sub-partition 2 and high-curvature lane sub-partition 3. Then, the empirical speeds of three vehicles during driving in the high-curvature lane sub-partition 1 include the speed m1 of the vehicle 1, the speed m2 of the vehicle 1, the speed n1 of the vehicle 2, the speed n2 of the vehicle 2, the speed p1 of the vehicle 3, the speed p2 of the vehicle 3 and the speed p3 of the vehicle 3, where the speed m2 of the vehicle 1 has the highest value among all the empirical speeds, so the speed m2 of the vehicle 2 is the empirical upper limit speed in the high-curvature lane sub-partition 1.

In one implementation, when the difference between the first empirical upper limit speed distribution and the second empirical upper limit speed distribution is calculated, the distribution shape similarity between the first empirical upper limit speed distribution and the second empirical upper limit speed distribution may be calculated first. If the similarity of the distribution shape is greater than or equal to the preset similarity threshold, the difference between two different vertical coordinates corresponding to the same horizontal coordinate is calculated respectively. By comparing the mean square error of the differences of all vertical coordinates with a preset difference threshold, it is determined whether the to-be-measured speed control feature is the target speed control feature, and if the distribution shape similarity is less than the preset similarity threshold, it is directly determined that the difference between the first empirical upper limit speed distribution and the second empirical upper limit speed distribution is relatively large, and the to-be-measured speed control feature is determined as the target speed control feature.

The empirical upper limit speed distribution can be expressed in the form of a histogram or in the form of other distribution graphs. The horizontal and vertical coordinates of different forms of empirical upper limit speed distributions may be different. A histogram, short for frequency histogram, represents a graph of data as a series of rectangles of equal width and unequal height. The width of the rectangle represents the interval of the data range, and the height of the rectangle represents the frequency of the data within the given interval. Therefore, when the empirical upper limit speed distribution adopts a histogram, the horizontal coordinate may include a plurality of vehicle speed ranges, and the vertical coordinate may include the frequency of vehicle speeds within a given vehicle speed range.

In one implementation, the method for acquiring the speed control label may include: for each to-be-counted preset lane segment, using the empirical upper limit speed of the to-be-counted preset lane segment as the target speed, and generating a speed control label including the target speed. However, the empirical upper limit speed is unique and not universal. If the empirical upper limit speed is directly used as the target speed, the problem of driving too fast and causing traffic accidents may occur. Therefore, in order to make the subsequent target speed predicted on the basis of the speed control model to further ensure traffic safety while improving traffic smoothness, the method for acquiring the speed control label includes: for each to-be-counted preset lane segment, performing fitting on a plurality of empirical speeds on the to-be-counted preset lane segment to obtain the empirical speeds of a plurality of speed grades, where the speed grade is positively correlated with the empirical speed, that is, the higher the speed grade, the greater the empirical speed; and using the average value of the empirical speed of the highest speed grade as the target speed of the to-be-counted preset lane segment, and generating a speed control label including the target speed. The fitting may be performed on the basis of a Gaussian mixture model on a plurality of empirical speeds on the to-be-counted preset lane segment, or may be performed on the basis of other fitting algorithms on a plurality of empirical speeds on the to-be-counted preset lane segment.

In one implementation, in order to further improve the integrity of the training sample set, thereby improving the prediction accuracy of the speed control model, when the preset lane segment includes traffic lights and/or obstacles, the training samples corresponding to the preset lane segment further include traffic light labels and/or obstacle labels in the preset lane segment. In addition, the training samples corresponding to each preset lane segment may also include at least one of the road type of the preset lane segment, the number of lanes to which the preset lane segment belongs and lane rank of the preset lane segment (that is, the ranking sequence of the lane). The road types include expressways and ordinary roads. Obstacles include bus stops, sidewalks, etc.

S120: training is carried out using the training sample set to obtain the speed control model for controlling the vehicle speed.

The speed control model can be a Vector Net model or other models. The loss function used in the training process of the speed control model is the mean square error function, that is, the Mean Square Error between the predicted value (predicted target speed) and the real value (real target speed) of the training sample can be calculated. When the mean square error is less than or equal to the preset error threshold, the model training converges to obtain the final required speed control model.

In order to improve the consistency of vehicle speed prediction, when the target speed control feature and speed control label of the road points in the preset lane segment are being selected, the interval between the road points can be made smaller, so that the input of two adjacent road points will be closer, making the output of the speed control model more continuous.

Compared with the related technologies that rely on the driver's own driving experience and/or the road conditions around the vehicle to adjust the vehicle speed, the embodiment of the present application provides a method for generating the speed control module which can obtain the speed control module by training the training sample set composed of starting coordinates and ending coordinates of each preset lane segment in the map data and target speed control features and speed control labels in the preset lane segment, so that vehicles can be automatically provided with an appropriate target speed on the basis of the speed control model, allowing the vehicles in entire road network to drive at an appropriate speed, thereby improving traffic smoothness while ensuring traffic safety.

In one implementation, before carrying out training using the training sample set to obtain the speed control model for controlling the vehicle speed, the method further includes: rotating the first preset lane segment, and adding the starting coordinates, the ending coordinates of the rotated first preset lane segment, and the target speed control feature corresponding to the rotated first preset lane segment and the speed control label corresponding to the rotated first preset lane segment to the training sample set as the training sample, where the first preset lane segment is the preset lane segment for rotating; and/or, proportionally scaling the second preset lane segment and the speed control label corresponding to the second preset lane segment, and adding the starting coordinates and the ending coordinates of the scaled second preset lane segment, the target speed control feature corresponding to the scaled second preset lane segment and the speed control label corresponding to the scaled second preset lane segment to the training sample set as the training sample, where the second preset lane segment is the preset lane segment for scaling.

The first preset lane segment and the second preset lane segment may be the same preset lane segment, or may be different preset lane segments. The first preset lane segment and the second preset lane segment may be determined manually, or may be determined according to preset screening rules. For example, the lane widths of the preset lane segments in the used map data are divided into two levels, with only very wide or very narrow preset lane segments, while lacking preset lane segments with intermediate widths, then very wide preset lane segments can be reduced, and the narrow preset lane segment is enlarged, so as to obtain a certain number of preset lane segments with intermediate widths. For another example, if in the used map data, there are more preset lane segments in the north-south direction and fewer preset lane segments in the east-west direction, the preset lane segments in the north-south direction can be rotated to obtain a certain number of preset lane segments in the east-west direction. For another example, if in the used map data, the number of preset lane segments that curve to the left is far greater than the number of preset lane segments that curve to the right, some or all of the preset lane segments that curve to the left can be rotated to obtain a certain number of preset lane segments that curve to the right.

During the scaling processing, the target speed in the second preset lane segment and the speed control label corresponding to the second preset lane segment may be proportionally enlarged or reduced while keeping the passing time unchanged; and during the rotation processing, since the length and width of the preset lane segment are not changed by the rotation, the first preset lane segment may be rotated directly.

In this embodiment of the present application, the training samples of the original speed control model are scaled and/or rotated, and the limited map data and driving experience information are used to obtain training samples of more scenes, so that the speed control model can learn training set data with more generalization ability, thereby improving the prediction accuracy of the speed control model.

In one implementation, in the process of detecting the vehicle speed, the obtained empirical speed may be abnormal due to reasons such as the failure of the speed sensor, thereby reducing the accuracy of the obtained training sample set. In order to solve the technical problem, abnormal data in a plurality of empirical speeds corresponding to each preset lane segment may be deleted.

The abnormal data includes at least one of the following:
  empirical speed less than or equal to a preset speed threshold on a high-speed road section;
  empirical speed number on preset road sections whose number of empirical speeds is less than or equal to a preset number of thresholds; and
  empirical speed on two adjacent road points whose empirical speed difference is greater than or equal to a preset speed difference threshold.

The preset speed threshold, the preset quantity threshold and the preset speed difference threshold can be determined according to actual experience. For example, the preset speed threshold is 20 km/h, the preset quantity threshold is 20, and the preset speed difference threshold is 8 km/h.

It should be noted that the step of deleting abnormal data may be before or after the target speed control feature is determined, which is not limited in this embodiment of the present application.

Figure 2:
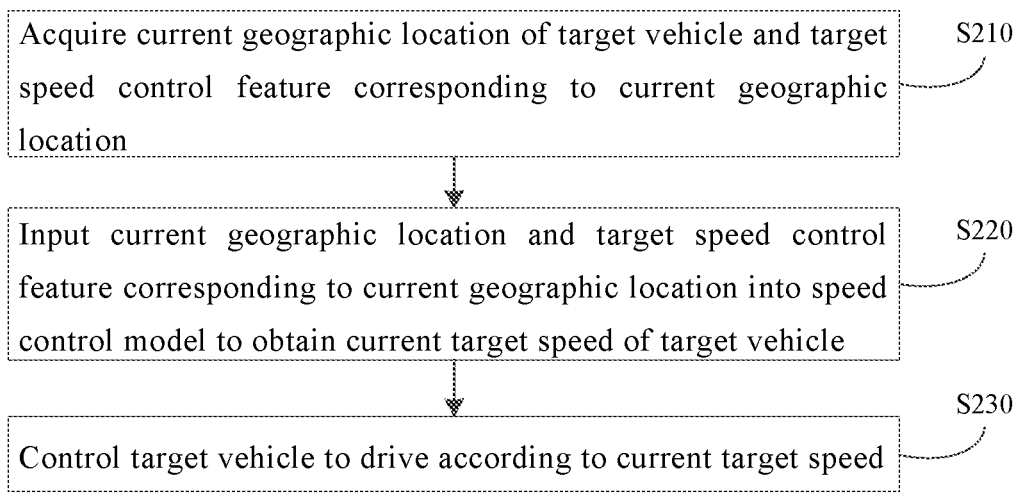
FIG. 2 is a schematic flow chart of a vehicle control method according to an embodiment of the present application.

Based on the above embodiment, another embodiment of the present application further provides a vehicle control method, which can be applied to an electronic device or a computer device, and specifically can be applied to vehicles or servers. As shown in FIG. 2, the method includes:

S210: the current geographic location of a target vehicle and a target speed control feature corresponding to the current geographic location is acquired.

The target speed control feature is a feature that affects the speed of the vehicle. The target speed control feature includes at least one of the following: road curvature, turning left at an intersection, turning right at an intersection, driving straight at an intersection, a ramp, a merging lane, and a diverging lane. When the target speed control feature corresponding to the current geographic location is being required, the current geographic location can be acquired from the map data first, and then the target speed control feature corresponding to the current geographic location can be acquired from the map data.

When the training sample set further includes at least one of the road type of the preset lane segment, the number of lanes of the road to which the preset lane segment belongs and the lane rank of the preset lane segment, the implementation of the present application also needs to acquire at least one of the road type corresponding to the current geographic location, number of lanes and lane rank. When the current geographic location is relatively close to the traffic light or the obstacle, the embodiment of the present application also needs to acquire the traffic light or the obstacle.

It should be added that when the embodiment of the present application is applied to the server, the target vehicle can locate a current geographic location of the target vehicle and report the current geographic location to the server, and the server acquires the target speed control feature corresponding to the current geographic location according to the map data, and input the current geographic location and the target speed control feature corresponding to the current geographic location into the speed control model, obtain the current target speed of the target vehicle, and send the current target speed to the target vehicle, and the target vehicle travels according to the current target speed.

S220: the current geographic location and the target speed control feature corresponding to the current geographic location is input into a speed control model to obtain the current target speed of the target vehicle.

The speed control model can be generated according to any one of the above embodiments of the method for generating a speed control model.

S230: the target vehicle is controlled to drive according to the current target speed.

In one implementation, specific implementations for controlling the target vehicle to drive according to the current target speed include but are not limited to the following two:

Method 1: the current vehicle speed is adjusted to the current target speed.

Method 2: when the current target speed is within the preset speed control range, the target vehicle is controlled to drive according to the current target speed. When the current target speed is outside the preset speed control range, the original vehicle speed can be maintained, or the driver manually adjusts the vehicle speed according to the road conditions around the vehicle.

The preset speed control range can be determined according to actual experience, and the preset speed control range corresponding to different preset lane segments may be the same or different.

When the current target speed is within the preset speed control range, the current vehicle speed can be directly adjusted to the current target speed, and the target preset speed control sub-range to which the current target speed belongs can be determined first, and the current vehicle speed can be adjusted as the specified speed within the target preset speed control sub-range.

The preset speed control range includes a plurality of preset speed control sub-ranges, and there is no intersection among the plurality of preset speed control sub-ranges. The specified speed in the target preset speed control sub-range may be the median value of the target preset speed control sub-range, or may be other values.

In general, two adjacent target speeds predicted on the basis of the speed control model may be close but different. In this embodiment of the present application, by adjusting the current vehicle speed to the specified speed in the target preset speed control sub-range corresponding to the current target speed, the two adjacent vehicle speeds can be made to be the specified speed, so that the continuity of the vehicle speed can be improved, thereby improving the driving stability of the vehicle.

It should be added that in order to improve the acquisition efficiency of the target preset speed control sub-range, the target speed in the speed control label in the training sample can be adjusted to a one-hot feature vector in the model training phase. The dimension of the one-hot feature vector is the same as the number of preset speed control sub-ranges, and a softmax layer is added to the speed control model. A vector containing the probability that the current target speed belongs to each preset speed control sub-range is predicted by the method of regression operation, and the target preset speed control sub-range has the highest probability.

After acquiring the current target speed, the target vehicle can directly adjust the current vehicle speed to the current target speed, or can control the target vehicle to drive according to the current target speed when the preset speed condition is met.

The preset speed condition includes at least one of the following:

(1) the current geographic location is beyond the legal speed limit range;

(2) the current geographic location is within the legal speed limit range, and the current target speed is less than or equal to the legal speed limit corresponding to the current geographic location;

(3) the difference between the current target speed and the last target speed is less than or equal to a second difference threshold, where the last target speed is the target speed last determined on the basis of the speed control model;

(4) the current target speed is less than or equal to the speed of the vehicle in front of the lane to which the target vehicle belongs; and (5) the distance between the current geographic location and the target traffic light is greater than or equal to a preset distance threshold, where the target traffic light is the closest traffic light in the driving direction of the target vehicle.

For items (1) and (2), the legal speed limit range refers to the speed limit area specified in the traffic regulations, for example, the speed limit area with a speed limit sign, and the speed limit area without a speed limit sign (for example, the speed limit on a highway without a centerline is 40 kilometers per hour), speed limit areas in special time periods and special weather (for example, the speed of passenger vehicles when driving at night shall not exceed 80% of the speed limit during the day, when driving on ordinary roads, in case of special weather such as ice, snow, sand and dust, the speed limit is 30 kilometers per hour). When the target vehicle is within the legal speed limit range and the current target speed is less than or equal to the legal speed limit corresponding to the current geographic location, or when the target vehicle is beyond the legal speed limit range, the target vehicle is controlled to drive according to the current target speed. On the basis of obeying traffic rules, the target vehicle can be provided with a suitable and safe speed for driving.

For item (3), when the difference between the current target speed and the last target speed is less than or equal to the second difference threshold, the target vehicle to drive according to the current target speed can avoid sudden changes in the speed of the target vehicle, thereby avoiding causing discomfort to passengers and even traffic accidents.

For items (4) and (5), traffic safety can be further improved by determining whether to control the target vehicle to drive according to the current target speed in combination with the actual road conditions (such as the driving situation of the vehicle ahead, traffic lights).

In addition, the target vehicle can be controlled to drive according to at least one of the legal speed limit, the last target speed and the speed of the vehicle in front of the lane to which the target vehicle belongs when the preset speed condition is not met.

When only item (2) of the preset speed condition is not met, the current vehicle speed can be adjusted to the legal speed limit; when only item (3) of the preset speed condition is not met, the current vehicle speed can be adjusted to the last target speed; when only item (4) of the preset speed condition is not met, the current vehicle speed can be adjusted to the speed of the vehicle in front of the lane to which the target vehicle belongs; when only items (2) and (3) of the preset speed condition are not met, the current vehicle speed can be adjusted to the minimum value between the legal speed limit and the last target speed; when only items (2) and (4) of the preset speed conditions are not met, the current vehicle speed can be adjusted to the minimum value between the legal speed limit and the speed of the vehicle in front of the lane to which the target vehicle belongs; when only items (3) and (4) of the preset speed conditions are not met, the current vehicle speed can be adjusted to the minimum value between the last target speed and the speed of the vehicle in front of the lane to which the target vehicle belongs; when only items (2), (3) and (4) of the preset speed conditions are not met, the current vehicle speed can be adjusted to the minimum value among the legal speed limit, the last target speed and the speed of the vehicle in front of the lane to which the target vehicle belongs; and when item (5) of the preset speed condition is not met, the current target speed can be output for the driver to refer to whether to adjust the current vehicle speed to the current target speed.

Compared with the related technologies that rely on the driver's own driving experience and/or the road conditions around the vehicle to adjust the vehicle speed, the vehicle control method provided by the embodiment of the present application can automatically predicate appropriate current target speed by inputting the current geographic location of the target vehicle and the target speed control feature corresponding to the current geographic location into pre-trained speed control model, and control the target vehicle to drive according to the current target speed, so as to allow the entire road network to drive at an appropriate speed, thereby improving traffic smoothness while ensuring traffic safety.

Figure 3:
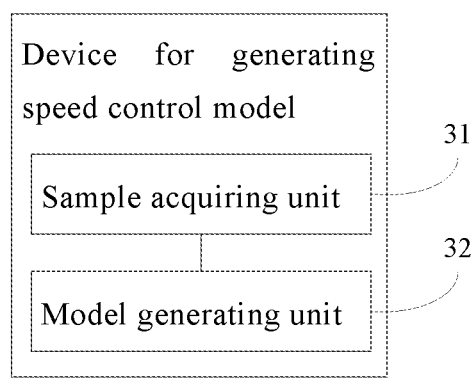
FIG. 3 is a composition block diagram of an apparatus for generating a speed control model according to an embodiment of the present application.

Corresponding to the above method embodiment, another embodiment of the present application provides an apparatus for generating a speed control model. As shown in FIG. 3, the apparatus includes:

a sample acquiring unit 31 for acquiring a training sample set, where each training sample in the training sample set includes: starting coordinates and ending coordinates of each preset lane segment in the map data, a target speed control feature and a speed control label in the preset lane segment, the target speed control feature being a feature that affects the speed of a vehicle, and the speed control label being a label of the target speed obtained according to empirical speed counting; and a model generating unit 32 for carrying out training using the training sample set to obtain the speed control model for controlling the vehicle speed.

In one implementation, the sample acquiring unit 31 includes:

a dividing module for dividing the lanes in the map data into a first lane partition and a second lane partition, where the first lane partition and the second lane partition indicate different to-be-measured speed control features; and a determining module for determining the to-be-measured speed control feature as the target speed control feature when the difference between the first empirical upper limit speed distribution and the second empirical upper limit speed distribution is greater than or equal to the first difference threshold, where the first empirical upper limit speed distribution includes a plurality of empirical upper limit speeds of a plurality of vehicles during driving in the first lane partition, and the second empirical upper limit speed distribution includes a plurality of empirical upper limit speeds of a plurality of vehicles during driving in the second lane partition.

In one implementation, the sample acquiring unit 31 includes:

a fitting module for, for each to-be-counted preset lane segment, performing fitting on a plurality of empirical speeds on the to-be-counted preset lane segment to obtain the empirical speeds of a plurality of speed grades, where the speed grade is positively correlated with the empirical speed; and a label generating module for using the average value of the empirical speeds of the highest speed grade as the target speed of the to-be-counted preset lane segment, and generating a speed control label including the target speed.

In one implementation, the sample acquiring unit 31 further includes: a first sample amplification module and/or a second sample amplification module;

the first sample amplification module is used for rotating the first preset lane segment before carrying out training using the training sample set to obtain the speed control model for controlling the vehicle speed, and adding the starting coordinates, the ending coordinates of the rotated first preset lane segment, and the target speed control feature corresponding to the rotated first preset lane segment and the speed control label corresponding to the rotated first preset lane segment to the training sample set as the training sample, where the first preset lane segment is the preset lane segment for rotating; and/or the second sample amplification module is used for proportionally scaling the second preset lane segment and the speed control label corresponding to the second preset lane segment, and adding the starting coordinates and the ending coordinates of the scaled second preset lane segment, the target speed control feature corresponding to the scaled second preset lane segment and the speed control label corresponding to the scaled second preset lane segment to the training sample set as the training sample, where the second preset lane segment is the preset lane segment for scaling.

In one implementation, when the preset lane segment includes traffic lights and/or obstacles, the training sample corresponding to the preset lane segment further includes traffic light labels and/or obstacle labels in the preset lane segment.

Compared with the related technologies that rely on the driver's own driving experience and/or the road conditions around the vehicle to adjust the vehicle speed, the embodiment of the present application provides an apparatus for generating the speed control module which can obtain the speed control module by training the training sample set composed of starting coordinates and ending coordinates of each preset lane segment in the map data and target speed control features and speed control labels in the preset lane segment, so that vehicles can be automatically provided with an appropriate target speed on the basis of the speed control model, allowing the entire road network to drive at an appropriate speed, thereby improving traffic smoothness while ensuring traffic safety.

Figure 4:
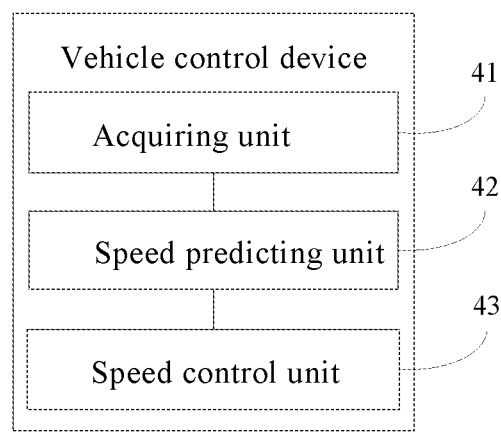
FIG. 4 is a composition block diagram of a vehicle control apparatus according to an embodiment of the present application.

Corresponding to the above method embodiment, another embodiment of the present application provides a vehicle control apparatus. As shown in FIG. 4, the apparatus includes:
- an acquiring unit 41 for acquiring the current geographic location of the target vehicle and the target speed control feature corresponding to the current geographic location, where the target speed control feature is a feature that affects the speed of the vehicle;
- a speed predicting unit 42 for inputting the current geographic location and the target speed control feature corresponding to the current geographic location into a speed control model to obtain a current target speed of the target vehicle, where the speed control model is generated by the method of any possible implementation of the first aspect; and
- a speed control unit 43 for controlling the target vehicle to drive according to the current target speed.

In one implementation, the speed control unit 43 includes a first speed control module and/or a second speed control module;
the first speed control module is used for adjusting the current vehicle speed to the current target speed;
the second speed control module is used for controlling the target vehicle to drive according to the current target speed when the current target speed is within a preset speed control range.

In one implementation, the second speed control module is used for determining a target preset speed control sub-range to which the current target speed belongs, and adjusting the current vehicle speed to a specified speed within the target preset speed control sub-range when the current target speed is within the preset speed control range, where the preset speed control range includes a plurality of preset speed control sub-ranges; or, adjusting the current vehicle speed to the current target speed when the current target speed is within the preset speed control range.

In one implementation, the target speed control feature includes at least one of the following:
road curvature, turning left at an intersection, turning right at an intersection, driving straight at an intersection, a ramp, a merging lane, and a diverging lane.

In one implementation, the speed control unit 43 is used for controlling the target vehicle to drive according to the current target speed when a preset speed condition is met, where the preset speed condition includes at least one of the following:

the current geographic location is beyond the legal speed limit range;
the current geographic location is within the legal speed limit range, and the current target speed is less than or equal to the legal speed limit corresponding to the current geographic location;
the difference between the current target speed and the last target speed is less than or equal to a second difference threshold, where the last target speed is the target speed last determined on the basis of the speed control model;
the current target speed is less than or equal to the speed of the vehicle in front of the lane to which the target vehicle belongs; and
the distance between the current geographic location and the target traffic light is greater than or equal to a preset distance threshold, where the target traffic light is the closest traffic light in the driving direction of the target vehicle.

In one implementation, the speed control unit 43 is further used for controlling the target vehicle to drive according to at least one of the legal speedlimit, the last target speed and the speed of the vehicle in front of the lane to which the target vehicle belongs when the preset speed condition is not met.

Compared with the related technologies that rely on the driver's own driving experience and/or the road conditions around the vehicle to adjust the vehicle speed, the vehicle control apparatus provided by the embodiment of the present application can automatically predicate appropriate current target speed by inputting the current geographic location of the target vehicle and the target speed control feature corresponding to the current geographic location into pre-trained speed control model, and control the target vehicle to drive according to the current target speed, so as to allow the entire road network to drive at an appropriate speed, thereby improving traffic smoothness while ensuring traffic safety.

Based on the above method embodiments, another embodiment of the present application provides a storage medium having executable instructions stored thereon. The instructions, when executed by a processor, enable the processor to implement the method described in any one of the above implementations.

Based on the above method embodiments, another embodiment of the present application provides an electronic device or computer apparatus, including:
one or more processors; and
a storage apparatus, configured to store one or more programs,
where the one or more programs, when executed by the one or more processors, enable the electronic device or computer apparatus to implement the method described in any one of the above implementations.

Based on the above method embodiments, another embodiment of the present application provides a vehicle, the vehicle including the apparatus described in any one of the above implementations or including the electronic device described above.

Figure 5:
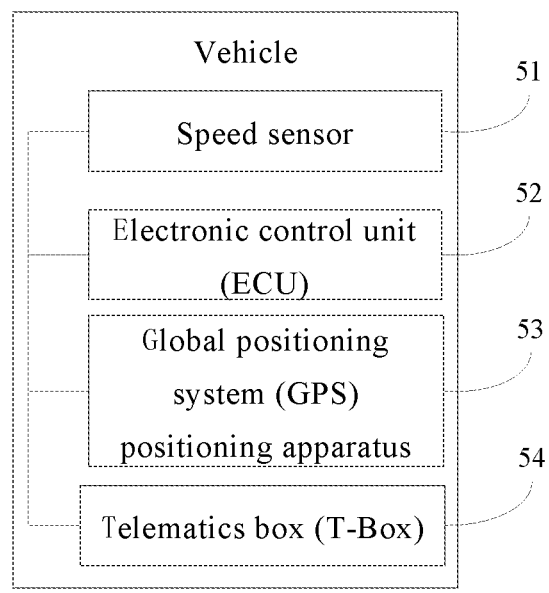
FIG. 5 is a schematic structural diagram of a vehicle according to an embodiment of the present application.

As shown in FIG. 5, the vehicle includes a speed sensor 51, an electronic control unit (ECU) 52, a global positioning system (GPS) positioning apparatus 53, and a telematics box (T-Box) 54. The speed sensor 51 is used to measure the speed of the vehicle, and the speed of the vehicle is used as the empirical speed for model training; the GPS positioning apparatus 53 is used to acquire the current geographical location of the vehicle; the T-Box 54 can be used as a gateway to communicate with the server; and the ECU 52 can execute the above method for generating the speed control model and/or the above vehicle control method, and can also acquire the current geographic location positioned by the GPS positioning apparatus 53, report the current geographic location to the server through the T-Box 54, receive the current target speed predicted by the server on the basis of the above vehicle control method, and control the vehicle to drive according to the current target speed.

Vehicles may also include: V2X (Vehicle-to-Everything) modules, radar and cameras. The V2X module is used to communicate with other vehicles, roadside apparatus, etc.; radar or camera is used to perceive road environment information in front and/or other directions, and the radar and/or camera can be configured in the front and/or rear of the vehicle body.

The above apparatus embodiments correspond to the method embodiments, and have the same technical effects as the method embodiments. For specific descriptions, refer to the method embodiments. The apparatus embodiment is obtained on the basis of the method embodiment. For specific descriptions, refer to the part of method embodiments, which will not be repeated here. Those of ordinary skill in the art can understand that: the accompanying drawing is only a schematic diagram of an embodiment, and the modules or processes in the accompanying drawing are not necessarily required to implement the present application.

Those of ordinary skill in the art can understand that: the modules in the apparatus in the embodiment may be distributed in the apparatus in the embodiment according to the description of the embodiment, and may also be located in one or more apparatuses different from this embodiment with corresponding changes. The modules in the above embodiments may be combined into one module, or may be further split into a plurality of sub-modules.

Finally, it should be noted that the above embodiments are only used for illustration of the technical solutions of the present application, but not limitation thereof; although the present application has been described in detail with reference to the above embodiments, those of ordinary skill in the art should understand that: it is still possible to modify the technical solutions described in the above embodiments, or perform equivalent substitutions to some of the technical features; however, these modifications or substitutions do not make the essence of the corresponding technical solutions deviate from the spirit and scope of the technical solutions of the embodiments of the present application.

What is claimed is:

1. A method for generating a speed control model, comprising:
    acquiring a training sample set, wherein each training sample in the training sample set comprises: starting coordinates and ending coordinates of each preset lane segment in map data, a target speed control feature and a speed control label in the preset lane segment, the target speed control feature being a feature that affects the speed of a vehicle, and the speed control label being a label of the target speed obtained according to empirical speed counting; and
    training, using the training sample set, to obtain a speed control model, wherein the speed control model is used to control the vehicle speed; and
    wherein the method for acquiring the target speed control feature comprises:
    dividing a lane in map data into a first lane partition and a second lane partition, wherein the first lane partition and the second lane partition indicate different to-be-measured speed control features; and
    determining the to-be-measured speed control feature as the target speed control feature when a difference between a first empirical upper limit speed distribution and a second empirical upper limit speed distribution is greater than or equal to a first difference threshold, wherein the first empirical upper limit speed distribution comprises a plurality of empirical upper limit speeds of a plurality of vehicles during driving in the first lane partition, and the second empirical upper limit speed distribution comprises a plurality of empirical upper limit speeds of a plurality of vehicles during driving in the second lane partition.

2. The method according to claim 1, wherein the method for acquiring the speed control label comprises:
    for each to-be-counted preset lane segment, performing fitting on a plurality of empirical speeds on the to-be-counted preset lane segment to obtain the empirical speeds of a plurality of speed grades, wherein the speed grade is positively correlated with the empirical speed; and
    using the average value of the empirical speeds of a highest speed grade as a target speed of the to-be-counted preset lane segment, and generating a speed control label comprising the target speed.

3. The method according to claim 1, wherein before the training, using the training sample set, to obtain the speed control model, the method further comprises at least one of the following:
    Rotating a first preset lane segment, and adding the starting coordinates, the ending coordinates of the rotated first preset lane segment, and the target speed control feature corresponding to the rotated first preset lane segment and the speed control label corresponding to the rotated first preset lane segment to the training sample set as the training sample, wherein the first preset lane segment is the preset lane segment for rotating; and
    proportionally scaling a second preset lane segment and the speed control label corresponding to the second preset lane segment, and adding the starting coordinates and the ending coordinates of the scaled second preset lane segment, the target speed control feature corresponding to the scaled second preset lane segment and the speed control label corresponding to the scaled second preset lane segment to the training sample set as the training sample, wherein the second preset lane segment is the preset lane segment for scaling.

4. The method according to claim 1, further comprises at least one of the following:
    when the preset lane segment comprises traffic lights, the training sample corresponding to the preset lane segment further comprises traffic light labels in the preset lane segment; and
    when the preset lane segment comprises obstacles, the training sample corresponding to the preset lane segment further comprises obstacle labels in the preset lane segment.

5. A vehicle control method, comprising:
    acquiring a current geographic location of a target vehicle and a target speed control feature corresponding to the current geographic location, wherein the target speed control feature is a feature that affects the speed of the target vehicle;
    inputting the current geographic location and the target speed control feature corresponding to the current geographic location into a speed control model to obtain a current target speed of the target vehicle, wherein the speed control model is generated by the following method:

acquiring a training sample set, wherein each training sample in the training sample set comprises: starting coordinates and ending coordinates of each preset lane segment in map data, a target speed control feature and a speed control label in the preset lane segment, the target speed control feature being a feature that affects the speed of a vehicle, and the speed control label being a label of the target speed obtained according to empirical speed counting; and training, using the training sample set, to obtain the speed control model, wherein the speed control model is used to control a vehicle speed; and controlling the target vehicle to drive according to the current target speed, and wherein the method for acquiring the target speed control feature comprises:

dividing a lane in map data into a first lane partition and a second lane partition, wherein the first lane partition and the second lane partition indicate different to-be-measured speed control features; and determining the to-be-measured speed control feature as the target speed control feature when a difference between a first empirical upper limit speed distribution and a second empirical upper limit speed distribution is greater than or equal to a first difference threshold, wherein the first empirical upper limit speed distribution comprises a plurality of empirical upper limit speeds of a plurality of vehicles during driving in the first lane partition, and the second empirical upper limit speed distribution comprises a plurality of empirical upper limit speeds of a plurality of vehicles during driving in the second lane partition.

6. The method according to claim 5, wherein the controlling the target vehicle to drive according to the current target speed comprises:

adjusting the current vehicle speed to the current target speed; or, controlling the target vehicle to drive according to the current target speed when the current target speed is within a preset speed control range.

7. The method according to claim 6, wherein the controlling the target vehicle to drive according to the current target speed when the current target speed is within the preset speed control range comprises:

determining a target preset speed control sub-range to which the current target speed belongs, and adjusting the current vehicle speed to a specified speed within the target preset speed control sub-range when the current target speed is within the preset speed control range, wherein the preset speed control range comprises a plurality of preset speed control sub-ranges; or, adjusting the current vehicle speed to the current target speed when the current target speed is within the preset speed control range.

8. The method according to claim 5, wherein the target speed control feature comprises at least one of the following:

road curvature, turning left at an intersection, turning right at an intersection, driving straight at an intersection, a ramp, a merging lane, and a diverging lane.

9. The method according to claim 5, wherein the controlling the target vehicle to drive according to the current target speed comprises:

controlling the target vehicle to drive according to the current target speed when a preset speed condition is met, wherein the preset speed condition comprises at least one of the following:

the current geographic location is beyond a legal speed limit range;

the current geographic location is within the legal speed limit range, and the current target speed is less than or equal to a legal limit speed corresponding to the current geographic location;

the difference between the current target speed and a last target speed is less than or equal to a second difference threshold, wherein the last target speed is the target speed last determined on the basis of the speed control model;

the current target speed is less than or equal to the speed of a vehicle in front of the lane to which the target vehicle belongs; and the distance between the current geographic location and a target traffic light is greater than or equal to a preset distance threshold, wherein the target traffic light is the closest traffic light in the driving direction of the target vehicle.

10. The method according to claim 9, wherein the method further comprises:

controlling the target vehicle to drive according to at least one of the legal limit speed, the last target speed and the speed of the vehicle in front of the lane to which the target vehicle belongs when the preset speed condition is not met.

11. A vehicle control apparatus, comprising:

one or more processors, and a non-transitory storage medium in communication with the one or more processors, the non-transitory storage medium configured to store program instructions, wherein, when executed by the one or more processors, the instructions cause the apparatus to perform:

acquiring a current geographic location of a target vehicle and a target speed control feature corresponding to the current geographic location, wherein the target speed control feature is a feature that affects the speed of the target vehicle;

inputting the current geographic location and the target speed control feature corresponding to the current geographic location into a speed control model to obtain a current target speed of the target vehicle, wherein the speed control model is generated by the method according to claim 1; and controlling the target vehicle to drive according to the current target speed; and wherein the method for acquiring the target speed control feature comprises:

dividing a lane in map data into a first lane partition and a second lane partition, wherein the first lane partition and the second lane partition indicate different to-be-measured speed control features; and determining the to-be-measured speed control feature as the target speed control feature when a difference between a first empirical upper limit speed distribution and a second empirical upper limit speed distribution is greater than or equal to a first difference threshold, wherein the first empirical upper limit speed distribution comprises a plurality of empirical upper limit speeds of a plurality of vehicles during driving in the first lane partition, and the second empirical upper limit speed distribution comprises a plurality of empirical upper limit speeds of a plurality of vehicles during driving in the second lane partition.

12. The apparatus according to claim 11, wherein the controlling the target vehicle to drive according to the current target speed comprises;
adjusting the current vehicle speed to the current target speed; and
controlling the target vehicle to drive according to the current target speed when the current target speed is within a preset speed control range.

13. The apparatus according to claim 12, wherein the controlling the target vehicle to drive according to the current target speed when the current target speed is within the preset speed control range is used for determining a target preset speed control sub-range to which the current target speed belongs, and adjusting the current vehicle speed to a specified speed within the target preset speed control sub-range when the current target speed is within the preset speed control range, wherein the preset speed control range comprises a plurality of preset speed control sub-ranges; or, adjusting the current vehicle speed to the current target speed when the current target speed is within the preset speed control range.

14. The apparatus according to claim 11, wherein the target speed control feature comprises at least one of the following:
road curvature, turning left at an intersection, turning right at an intersection, driving straight at an intersection, a ramp, a merging lane, and a diverging lane.

15. The apparatus according to claim 11, wherein the controlling the target vehicle to drive according to the current target speed is used for controlling the target vehicle to drive according to the current target speed when a preset speed condition is met,
wherein the preset speed condition comprises at least one of the following:
the current geographic location is beyond a legal speed limit range;
the current geographic location is within the legal speed limit range, and the current target speed is less than or equal to a legal limit speed corresponding to the current geographic location;
the difference between the current target speed and a last target speed is less than or equal to a second difference threshold, wherein the last target speed is the target speed last determined on the basis of the speed control model;
the current target speed is less than or equal to the speed of a vehicle in front of the lane to which the target vehicle belongs; and
the distance between the current geographic location and a target traffic light is greater than or equal to a preset distance threshold, wherein the target traffic light is the closest traffic light in the driving direction of the target vehicle.

16. The apparatus according to claim 15, wherein the controlling the target vehicle to drive according to the current target speed is further used for controlling the target vehicle to drive according to at least one of the legal limit speed, the last target speed and the speed of the vehicle in front of the lane to which the target vehicle belongs when the preset speed condition is not met.

17. A vehicle, comprising a vehicle control apparatus, the vehicle control apparatus comprises:
one or more processors, and a non-transitory storage medium in communication with the one or more processors, the non-transitory storage medium configured to store program instructions, wherein, when executed by the one or more processors, the instructions cause the apparatus to perform:
acquiring a current geographic location of a target vehicle and a target speed control feature corresponding to the current geographic location, wherein the target speed control feature is a feature that affects the speed of the target vehicle;
inputting the current geographic location and the target speed control feature corresponding to the current geographic location into a speed control model to obtain a current target speed of the target vehicle, wherein the speed control model is generated by the method according to claim 1; and
controlling the target vehicle to drive according to the current target speed; and
wherein the method for acquiring the target speed control feature comprises:
dividing a lane in map data into a first lane partition and a second lane partition, wherein the first lane partition and the second lane partition indicate different to-be-measured speed control features; and
determining the to-be-measured speed control feature as the target speed control feature when a difference between a first empirical upper limit speed distribution and a second empirical upper limit speed distribution is greater than or equal to a first difference threshold, wherein the first empirical upper limit speed distribution comprises a plurality of empirical upper limit speeds of a plurality of vehicles during driving in the first lane partition, and the second empirical upper limit speed distribution comprises a plurality of empirical upper limit speeds of a plurality of vehicles during driving in the second lane partition.

* * * * *